US012725226B2

(12) United States Patent
Wu et al.

(10) Patent No.: US 12,725,226 B2
(45) Date of Patent: Sep. 1, 2026

(54) IMAGE PROCESSING METHOD AND APPARATUS, AND ELECTRONIC DEVICE AND COMPUTER-READABLE STORAGE MEDIUM

(71) Applicant: Douyin Vision Co., Ltd., Beijing (CN)

(72) Inventors: Jinyuan Wu, Beijing (CN); Yongwen Wu, Beijing (CN); Haitao Lv, Beijing (CN)

(73) Assignee: Douyin Vision Co., Ltd., Beijing (CN)

( * ) Notice: Subject to any disclaimer, the term of this patent is extended or adjusted under 35 U.S.C. 154(b) by 156 days.

(21) Appl. No.: 18/246,389

(22) PCT Filed: Aug. 26, 2021

(86) PCT No.: PCT/CN2021/114717

§ 371 (c)(1),
(2) Date: Mar. 23, 2023

(87) PCT Pub. No.: WO2022/068479

PCT Pub. Date: Apr. 7, 2022

(65) Prior Publication Data

US 2023/0360184 A1 Nov. 9, 2023

(30) Foreign Application Priority Data

Sep. 30, 2020 (CN) ......................... 202011065575.3

(51) Int. Cl.
*G06T 5/50* (2006.01)
*G06T 7/20* (2017.01)
(Continued)

(52) U.S. Cl.
CPC .................. *G06T 5/50* (2013.01); *G06T 7/20* (2013.01); *G06T 7/70* (2017.01); *G06T 17/00* (2013.01); *G06T 2207/20221* (2013.01)

(58) Field of Classification Search
CPC ................ G06T 5/50; G06T 7/20; G06T 7/70
See application file for complete search history.

(56) References Cited

U.S. PATENT DOCUMENTS

2014/0232743 A1* 8/2014 Na ..................... H04N 1/32144 345/629
2017/0096106 A1 4/2017 Higuchi et al.
(Continued)

FOREIGN PATENT DOCUMENTS

CN 102365613 A 2/2012
CN 103856707 A 6/2014
(Continued)

OTHER PUBLICATIONS

China National Intellectual Property Administration, Office Action and Search Report Issued in Application No. 202011065575.3, Sep. 24, 2021, 12 pages.
(Continued)

*Primary Examiner* — Yi Yang
(74) *Attorney, Agent, or Firm* — Alleman Hall LLP

(57) ABSTRACT

Provided are an image processing method and apparatus, and an electronic device and a computer-readable storage medium, which relate to the technical field of image processing. The method is applied to a terminal, and the terminal comprises a first photographing apparatus and a second photographing apparatus. The method comprises: collecting a first video image by means of a first photographing apparatus, and displaying the first video image on a screen; and when it is detected that a display object in the first video image meets a pre-set switching condition, switching to collecting a second video image by means of a second photographing apparatus, and displaying the second video image on the screen. By means of the embodiments of the present disclosure, the automatic switching of a photo-
(Continued)

graphing apparatus can be realized on the basis of a display object in an image collected by the photographing apparatus.

16 Claims, 8 Drawing Sheets

(51) Int. Cl.
*G06T 7/70* (2017.01)
*G06T 17/00* (2006.01)

(56) References Cited

U.S. PATENT DOCUMENTS

| | | | | |
|---|---|---|---|---|
| 2018/0198990 | A1* | 7/2018 | Greenberger | H04N 5/2621 |
| 2018/0343294 | A1* | 11/2018 | Rands | G06F 16/24575 |
| 2019/0356837 | A1* | 11/2019 | Bakshi | H04N 7/142 |
| 2020/0053253 | A1* | 2/2020 | Kavallierou | H04N 21/4622 |
| 2020/0265614 | A1* | 8/2020 | Jung | G06T 11/00 |

FOREIGN PATENT DOCUMENTS

| | | | |
|---|---|---|---|
| CN | 105049711 | A | 11/2015 |
| CN | 105391965 | A | 3/2016 |
| CN | 105554386 | A | 5/2016 |
| CN | 106131425 | A | 11/2016 |
| CN | 106210531 | A | 12/2016 |
| CN | 106303260 | A | 1/2017 |
| CN | 106657774 | A | 5/2017 |
| CN | 108022279 | A | 5/2018 |
| CN | 109327568 | A | 2/2019 |
| CN | 109889893 | A | 6/2019 |
| CN | 110058685 | A | 7/2019 |
| CN | 110413171 | A | 11/2019 |
| CN | 110769302 | A | 2/2020 |
| CN | 111258413 | A | 6/2020 |
| CN | 111464761 | A | 7/2020 |
| CN | 111722775 | A | 9/2020 |
| CN | 112199016 | A | 1/2021 |
| JP | 2002262178 | A | 9/2002 |

OTHER PUBLICATIONS

China National Intellectual Property Administration, International Search Report Issued in Application No. PCT/CN2021/114717, Nov. 11, 2021, WIPO, 6 pages.

China National Intellectual Property Administration, Notice of Grant Issued in Application No. 202011065575.3, Jan. 5, 2023, 6 pages.

Fan et al., “The State of Motion Stereo About Plant Leaves Monitoring System Design and Simulation,” Proceedings of 11th International Conference on Computer and Computing Technologies in Agriculture (CCTA), Aug. 2017, Jilin, China, 20 pages.

“Multi-point camera tracking and automatic video switching system,” China Academic Journal Electronic Publishing House, Sep. 1, 2006, 9 pages.

“Video processing skills Play wonderful, we have tricks,” China Academic Journal Electronic Publishing House, Nov. 30, 2016, 6 pages.

Feng Rui et al.; The Constrution of Learning Social Networking Sites in the Perspective Connectionism; Journal of Distance Education; Issue 3; Apr. 2013; p. 10-16 (English Abstract on p. 16). 7 pages.

ISA China National Intellectual Property Administration, Written Opinion for International Application No. PCT/CN2021/114717, mailed Nov. 11, 2021, 9 Pages.

* cited by examiner (a) Time instant T1
First video image acquired by first photographing device (b) Time instant T2
First video image acquired by first photographing device (c) Time instant T3
Second video image acquired by second photographing device (d) Time instant T4
Second video image acquired by second photographing device Time instant T5
Second video image acquired by second photographing device

IMAGE PROCESSING METHOD AND APPARATUS, AND ELECTRONIC DEVICE AND COMPUTER-READABLE STORAGE MEDIUM

CROSS-REFERENCE TO RELATED APPLICATION

The present application is the national phase application of PCT International Patent Application No. PCT/CN2021/114717, filed on Aug. 26, 2021 which claims the priority to Chinese Patent Application No. 202011065575.3, titled "IMAGE PROCESSING METHOD AND APPARATUS, AND ELECTRONIC DEVICE AND COMPUTER-READABLE STORAGE MEDIUM", filed on Sep. 30, 2020 with the Chinese Patent Office, both of which are incorporated herein by reference in their entireties.

FIELD

The present disclosure relates to the technical field of image processing, and in particular to an image processing method, an image processing apparatus, an electronic device and a computer-readable storage medium.

BACKGROUND

With the development of mobile Internet and the wide use of mobile terminals, many users begin to spontaneously create contents and upload the created contents to social platforms to share with others. Usually, the user creating contents use a shooting device on the mobile terminal to capture favorite images and videos and upload the images and videos to a social platform to share with other users. However, in the shooting process according to the conventional technology, the user can only use a front camera to take a portrait of the user or use a rear camera to capture an image seen by the user, obtaining single shooting effect and content.

SUMMARY

The content part of the present disclosure is provided to introduce concepts in a brief form, and these concepts are to be described in detail in the following embodiments. The content of the present disclosure is not intended to identify the key features or essential features of the claimed technical solutions, nor is it intended to be used to limit the scope of the claimed technical solutions.

In a first aspect, an image processing method is provided according to an embodiment of the present disclosure. The image processing method is applied to a terminal. The terminal includes a first photographing device and a second photographing device. The method includes: acquiring a first video image by using the first photographing device, and displaying the first video image on a screen; and in a case that it is detected that a display object in the first video image meets a preset switching condition, performing switching to acquire a second video image by using the second photographing device, and displaying the second video image on the screen.

In a second aspect, an image processing apparatus is provided according to an embodiment of the present disclosure. The image processing apparatus is applied to a terminal. The terminal includes a first photographing device and a second photographing device. The apparatus includes: a video display module and a switching display module. The video display module is configured to acquire a first video image by using the first photographing device, and display the first video image on a screen. The switching display module is configured to, in a case that it is detected that a display object in the first video image meets a preset switching condition, perform switching to acquire a second video image by using the second photographing device, and display the second video image on the screen.

In a third aspect, an electronic device is provided according to an embodiment of the present disclosure. The electronic device includes one or more processors and a memory. The memory stores a computer program. The computer program, when executed by the one or more processors, causes the electronic device to perform the method provided in the first aspect.

In a fourth aspect, a computer-readable storage medium is provided according to an embodiment of the present disclosure. The computer-readable medium storage stores a computer program. The computer program, when executed by a processor, causes the processor to perform the method provided in the first aspect.

The image processing method, the image processing apparatus, the electronic device and the computer-readable storage medium according to the embodiments of the present disclosure are applied to a terminal including two photographing devices. A first video image is acquired by a first photographing device, and the first video image is displayed on a screen of the terminal. In a case that it is detected that a display object in the first video image meets a preset switching condition, switching is performed to acquire a second video image by using the second photographing device, and the second video image is displayed on the screen. Thus, according to the embodiments of the present disclosure, automatic switching is performed between different photographing devices in the terminal based on the state of the display object in the first video image in a photographing progress. The first photographing device of the terminal is switched to the second photographing device of the terminal, and the screen of the terminal switches from displaying the first video image acquired by the first photographing device to displaying the second video image acquired by the second photographing device. Therefore, the user is provided with photographing possibilities and fun, and the user can capture creative works based on automatic switching between photographing devices in a photographing process, enriching photographing manners and improving the user's photographing experience.

BRIEF DESCRIPTION OF THE DRAWINGS

The above and other features, advantages and aspects of the embodiments of the present disclosure will be more apparent in conjunction with the accompanying drawings and with reference to the following embodiments. Throughout the drawings, the same or similar reference numerals represent the same or similar elements. It should be understood that the drawings are schematic and the originals and elements are unnecessarily drawn to scale.

DETAILED DESCRIPTION OF THE EMBODIMENTS

Figure 1:
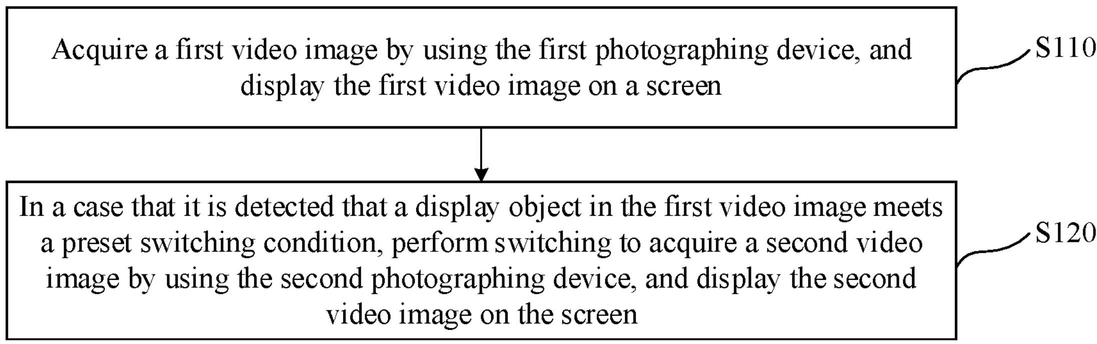
FIG. 1 shows a flow chart of an image processing method according to an embodiment of the present disclosure.

The embodiments of the present disclosure are described in detail below with reference to the accompanying drawings. Although the drawings show some embodiments of the present disclosure, it should be understood that the present disclosure can be implemented in various forms and is not limited to the embodiments. The embodiments are provided for a more thorough and complete understanding of the present disclosure. It should be understood that the drawings and the embodiments in the present disclosure are only illustrative of the disclosure, and are not intended to limit the protection scope of the present disclosure.

It should be understood that the steps of the method according to the embodiments of the present disclosure may be performed in different orders, and/or be performed in parallel. In addition, the method embodiments may include additional steps and/or omit to perform the illustrated steps, not limiting the scope of the present disclosure.

The term "including" and its variants as used herein are open-ended includes, that is, "including but not limited to". The term "based on" means "based at least in part on." The term "one embodiment" means "at least one embodiment". The term "another embodiment" means "at least one additional embodiment". The term "some embodiments" means "at least some embodiments". Definitions of other terms are provided in the following description.

It should be noted that, the terms "first" "second" and so on mentioned in the present disclosure are only used to distinguishing different apparatuses, modules or units, rather than limit an order of functions performed by the apparatus, module or unit or limit interdependence.

It should be noted that, the terms "one" and "multiple" mentioned in the present disclosure are schematic rather than restrictive, and should be understood as "one or more" by those skilled in the art, otherwise explicitly illustrated in the context.

The names of messages or information exchanged between multiple devices in the embodiments of the present disclosure are only illustrative, and are not intended to limit the scope of the messages or information.

The technical solutions in the present disclosure and how to solve the above technical problems by using the technical solutions in the present disclosure are described in detail below with specific embodiments. The following embodiments may be combined with each other, and the same or similar concepts or processes may not be repeated in some embodiments. The embodiments of the present disclosure are described below in combination with the accompanying drawings.

The image processing method, the image processing apparatus, the electronic device and the computer-readable storage medium according to the embodiments of the present disclosure are described in detail below with reference to specific embodiments.

The image processing method according to the embodiments of the present disclosure may be applied to a terminal. The terminal includes a first photographing device and a second photographing device. The first photographing device and the second photographing device may be fixed in the terminal and may be rotatable. The first photographing device and the second photographing device may be arranged on different sides of the terminal. The first photographing device and the second photographing device may include any device capable of collecting images, such as a camera, which are not limited herein. The terminal may be any device arranged with at least two photographing devices, such as a smart phone, a tablet computer, a MP3 (Moving Picture Experts Group Audio Layer III) player, a MP4 (Moving Picture Experts Group Audio Layer IV) player, a wearable device, a vehicle mounted device, an Augmented Reality (AR)/Virtual Reality (VR) device, a laptop, an Ultra-Mobile Personal Computer (UMPC), a netbook, a personal digital assistant (PDA), and a specialized camera (such as a single lens reflex camera and a card camera). The type of the terminal is not limited in the embodiments of the present disclosure.

The terminal may run a client application. The client application may include client application software corresponding to the photographing devices and other client application software with photographing function, and is not limited in the present disclosure.

Reference is made to FIG. 1, which shows a flow chart of an image processing method according to an embodiment of the present disclosure. The image processing method may be applied to the terminal arranged with multiple photographing devices (such as, two photographing devices). The flow chart shown in FIG. 1 is described in detail below. The image processing method may include the following steps S110 and S120.

In step S110, a first video image is acquired by using a first photographing device, and the first video image is displayed on a screen.

The terminal includes at least two photographing devices, which are recorded as a first photographing device and a second photographing device. The first photographing device and the second photographing device may be arranged on different sides of the terminal. In some embodiments, the terminal includes four borders: an upper border, a lower border, a left border, and a right border. In a case that the user, facing the screen of the terminal, holds the terminal, the border on the left side of the screen is the left border, the border on the right side of the screen is the right border, the border on the upper side of the screen is the upper border, and the border on the lower side of the screen is the lower border. One of the first photographing device and the second photographing device may be arranged on a side where the screen of the terminal is located and on any one of the top border, the bottom border, the left border and the right border, and the other one of the first photographing device and the second photographing device may be arranged on a side where the rear shell of the terminal is located and on any one of the top border, the bottom border, the left border and the right border.

For example, one of the first photographing device and the second photographing device may be arranged on the side where the screen of the terminal is located, that is, that is, one of cameras is a front camera; and the other one of the first photographing device and the second photographing device may be arranged on the side where the rear shell of the terminal is located, that is, the other one of the cameras is a rear camera. The positions where the first photographing device and the second photographing device are arranged are not limited in the present disclosure.

The screen of the terminal may display an image acquired by the first photographing device in real time, that is, the first video image. The first video image may be an original image acquired by the first photographing device, or an image obtained by performing an adjustment operation on an original image. The adjustment operation may include adjustment operations for parameters such as a contrast parameter, a brightness parameter, a focusing parameter and an aperture parameter, and may include operations of adding a filter, a sticker, a special effect or the like to the first video image, which is not limited in the present disclosure.

In some embodiments, the first photographing device may be a camera that is to be started by default when a photographing function in a client application is started. For example, when the terminal obtains a starting command for a photographing function of a client application, the photographing function may be started. When the photographing function is started, the first photographing device may be started by default, and the first video image acquired by the first photographing device in real time is displayed on the screen. The first photographing device may be a front camera or a rear camera, which is not limited herein.

In other embodiments, the user may determine whether to start the first photographing device. For example, in a case that the second photographing device is started by default when the photographing function is started, the user may switch the second photographing device to the first photographing device by clicking a control, such as a flipping photographing device control, on the screen to use the first photographing device to acquire an image, and the first video image acquired by the first photographing device in real time is displayed on the screen.

In step S120, in a case that it is detected that a display object in the first video image meets a preset switching condition, switching is performed to acquire a second video image by using the second photographing device, and the second video image is displayed on the screen.

The second video image may include an original image acquired by the second photographing device, or an image obtained by performing an adjustment operation on an original image. The adjustment operation may include adjustment operations for parameters such as a contrast parameter, a brightness parameter, a focusing parameter and an aperture parameter, and may include operations of adding a filter, a sticker, a special effect or the like to the second video image, which is not limited in the present disclosure.

In some embodiments, on detecting that a display object in the first video image meets a preset switching condition, the terminal may generate a photographing device switching control instruction, and call an application programming interface (API) for controlling photographing devices based on the photographing device switching control instruction. Then, a state of the first photographing device currently acquiring the first video image is switched from a start state to an off state or a sleep state, the second photographing device is started, and a state of the second photographing device is switched from an off state or a sleep state to a start state. Thus, the second photographing device may acquire a second video image, and the second video image is displayed on the screen.

The display object in the first video image may include a target object in the first video image or other objects superimposed on the first video image, which is not limited in the embodiment. The terminal may detect the display object in the first video image while acquiring and displaying the first video image to determine whether the display object meets a preset switching condition. In a case that the display object meets the preset switching conditions, switching is performed to acquire the second video image by using the second photographing device, and the second video image is displayed on the screen. Thus, automatic switching between photographing devices is performed in acquiring images without manual operation by the user. With the switching of different photographing devices, video images acquired by the different photographing devices may be switched and displayed on the screen, and the first video image and the second video image acquired by the different photographing devices are recorded and combined into a video image. Therefore, the user can capture creative works based on automatic switching between photographing devices in a photographing process, enriching photographing manners and improving the user's photographing experience.

It should be noted that in some embodiments, the terminal may perform the image processing method according to the embodiments of the present disclosure in a previewing process before starting photographing, so that the user may preview a final effect in the preview phase before photographing. That is, the whole effect may be previewed in real time. Thus, the user may preview the effect that can be achieve by performing photographing with the image processing method according to the embodiments of the present disclosure before photographing, so that the user is stimulated to perform photographing with the image processing method and is promoted to make photographic works. In addition, in some embodiments, the terminal may perform the image processing method provided according to the embodiments of the present disclosure when starting photographing, which is not limited in the embodiments of the present disclosure.

In the image processing method according to the embodiments of the present disclosure, the first video image is acquired by the first photographing device and is displayed on the screen. In a case that it is detected that a display object in the first video image meets a preset switching condition, switching is performed to acquire the second video image by using the second photographing device, and the second video image is displayed on the screen. Thus, according to the embodiments of the present disclosure, automatic switching is performed between photographing devices based on the display object in the first video image in a photographing progress. The first photographing device of the terminal is switched to the second photographing device of the terminal, and the image displayed on the screen is switched from the first video image acquired by the first photographing device to the second video image acquired by the second photographing device. Therefore, the user can capture interesting and creative works based on automatic switching between photographing devices in a photographing process, enriching photographing manners and improving the user's photographing experience.

Figure 2:
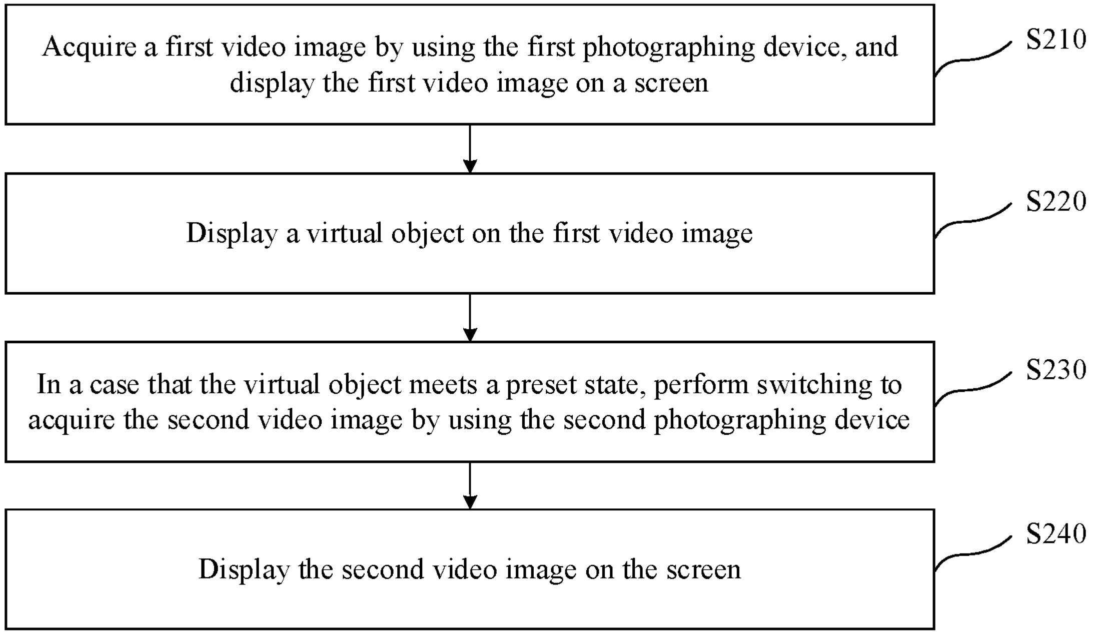
FIG. 2 shows a flow chart of an image processing method according to another embodiment of the present disclosure.

In some embodiments, a virtual object may be displayed in the first video image, and then the terminal may trigger the switching between different photographing devices based on the virtual object. Specifically, reference is made to FIG. 2, which shows a flow chart of an image processing method according to another embodiment of the present disclosure. In the embodiment, the method may include the following steps S210 to S240.

In step S210, a first video image is acquired by using the first photographing device, and the first video image is displayed on a screen.

In step S220, a virtual object is displayed in the first video image.

The virtual object may include any one of a virtual person, a virtual animal, a virtual plant, a virtual object and the like, and the virtual object may include any object such as a love and a star, which are not limited in the embodiment. In an embodiment, the virtual object may include a three-dimension solid model created according to an animation technology, and the virtual object may include a two-dimension virtual model. Each virtual object has a shape and a size.

In some embodiments, on detecting a virtual object display request, the terminal may determine a virtual object to be displayed by analyzing the request, and display the virtual object on the first video image.

The virtual object display request may be manually triggered by performing a touch operation on the screen of the terminal, or be automatically triggered based on image identification.

In some embodiments, the virtual object display request may be manually triggered by performing a touch operation. For example, a virtual object request display control for requesting displaying a virtual object may be displayed on the screen of the terminal. When a touch operation performed on the control is detected, it may be determined that a corresponding virtual object display request is detected. Different controls may correspond to different virtual objects. Touching different controls may trigger different virtual object display requests. Different virtual object display requests contain different virtual object identifiers. On detecting a virtual object display request, the terminal may perform analysis to obtain a corresponding virtual object identifier, and determine a virtual object corresponding to the virtual object identifier, and then display the virtual object on the first video image.

In an embodiment, a special effect selection control may be displayed on the screen. The special effect selection control is configured to trigger displaying a special effect selection page. The special effect selection page may display one or more special effect selection controls. With different special effect selection controls, same or different functions are performed. On detecting a triggering operation performed on a special effect selection control corresponding to the image processing function according to the embodiments of the present disclosure (that is, a virtual object display request is triggered), the terminal may directly perform the image processing method according to the embodiments of the present disclosure, and the virtual object is superimposed in the first video. In an embodiment, on detects a triggering operation performed on a special effect selection control corresponding to the image processing function according to the embodiments of the present disclosure, the terminal may trigger displaying a corresponding virtual object selection page which may display a virtual object request display control corresponding to at least one virtual object. Thus, the terminal may determine a function required to be realized based on a special effect selection control touched by the user, and then determine a virtual object to be displayed based on a virtual object request the display control touched by the user, thereby realizing selection and display of multiple virtual objects. The image processing method according to the embodiments of the present disclosure may be performed on detecting that a special effect selection control is triggered, realizing the photographing function based on the automatic switching between the photographing devices.

Figure 3:
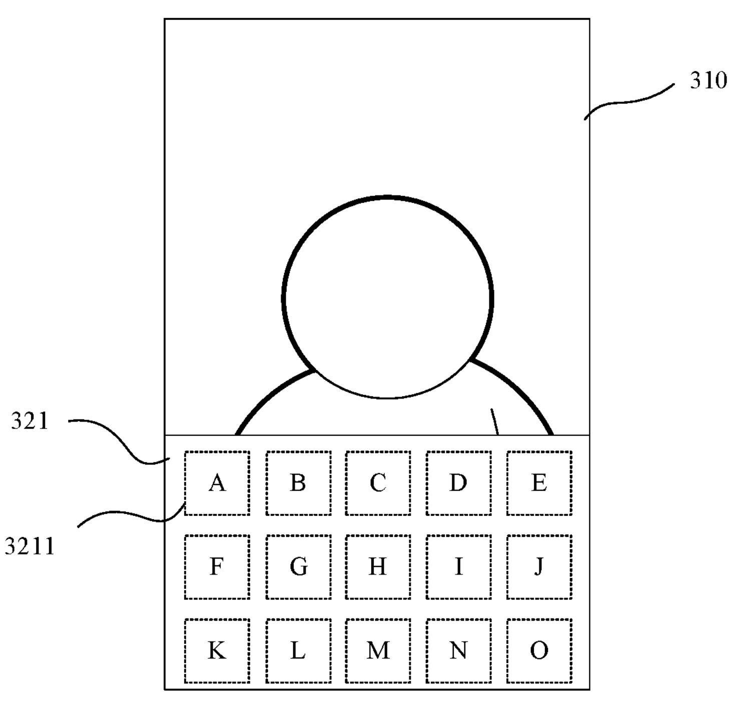
FIG. 3 shows a schematic diagram of an interface according to an exemplary embodiment of the present disclosure.

In an example, on detecting a triggering operation performed on a special effect selection control, the terminal may display a corresponding virtual object selection page on the screen as shown in FIG. 3. FIG. 3 shows a schematic diagram of an interface according to an exemplary embodiment of the present disclosure. The screen includes two display regions: a display region for displaying an acquisition screen 310 and a display region for displaying a virtual object selection page 321. A virtual object request display control 3211 corresponding to multiple virtual objects (such as virtual objects A to O) is displayed in the virtual object selection page 321. The acquisition screen 310 may display the first video image acquired by the first photographing device.

In an embodiment, a virtual object display request may be automatically triggered based on image identification. The terminal may detect a first target object in the first video image, and display a virtual object on the first video image based on a trigger action of the detected first target object. Thus, the step S220 may be performed by: in a case that it is detected that the first target object in the first video image performs a preset trigger action, displaying the virtual object on the first video image.

The first target object may be a target person in the first video image. The preset trigger action corresponding to the first target object may include at least one of a preset body posture, a preset gesture, a preset expression, a preset body action, and the like. That the first target object performs a preset trigger action may include at least one of: the first target object is in a preset body posture, such as a hands-akimbo posture; the first target object performs a preset trigger gesture, such as an "ok" gesture, a hands-together gesture and a gesture of drawing a heart with hands; the first target object performs a preset expression, such as a smiling expression and a laughing expression; the first target object performs a preset action, such as a blinking action, a waving action, and a mouth-pouting action; and the like. The preset trigger action may be determined according to the actual requirements and may be preset by a program or be defined by the user, which is not limited herein. Therefore, the target object in the first video image is detected, and the virtual object may be displayed on the first video image on detecting that the first target object performs a preset trigger action, thereby automatically triggering generating a display virtual object without manual operations by the user, enrich the interest of photographing and improving the user's photographing experience.

In addition, the first target object may include an object, such as an animal, capable of performing a preset trigger action, and is not limited herein.

In an embodiment, the first target object may be a preset object. The terminal may store a preset image of the preset object in advance. When the target object in the first video image is detected, the detected target object may be matched with the preset image. In a case that the detected target object is matched with the preset image, it may be determined that the first target object is detected, and it is further detected whether the first target object performs a preset trigger action, and then subsequent operations are performed. Therefore, the virtual object is displayed based on the detection of the triggering action of the preset object, reducing the cost of computing resources, avoiding confusion of displaying a virtual object caused by simultaneous detection of multiple objects performing preset trigger actions, thereby improving system stability and user's photographing experience.

In addition, in another embodiment, the first target object may be a non-preset object. That is, the first target object may be any object within a photographing range of the first photographing device. The displaying of a virtual object is triggered based on detecting whether the object performs a preset trigger action.

In some embodiments, the screen of the terminal may display prompt information for prompting the user about a function of a triggered control and/or how to trigger a function. The prompt information may include information in any one or more forms such as an image form and a text form, and may include information in a voice form, which is not limited in the embodiments.

Figure 4:
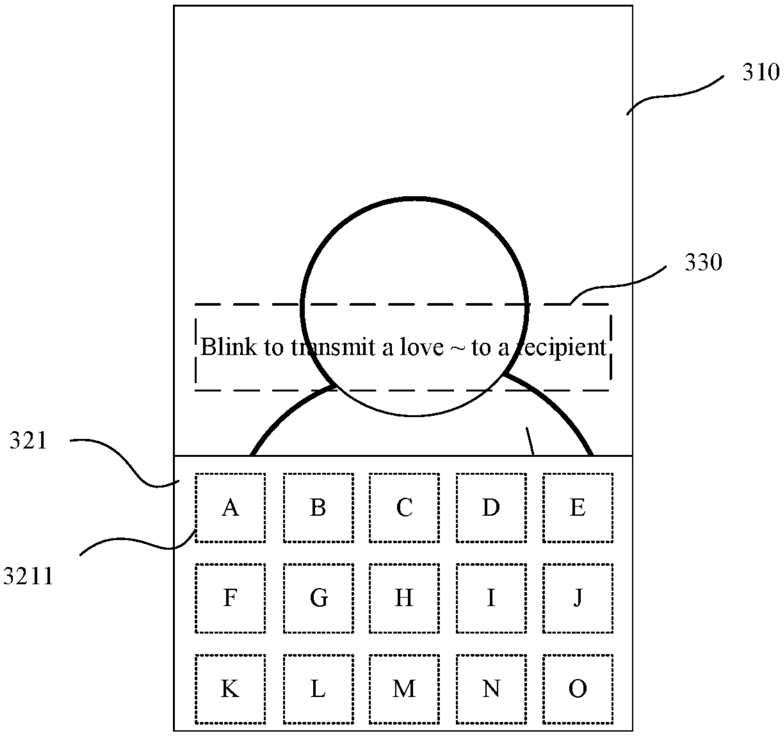
FIG. 4 shows a schematic diagram of an interface according to another exemplary embodiment of the present disclosure.

In an example, taking the virtual object as a love, the terminal may display prompt information in a text form on the screen. For example, as shown in FIG. 4, the terminal may display prompt information 330 "Blink to transmit a love~to a recipient" in the center of the screen to prompt the user to perform a blinking action to trigger displaying a love and transmitting the love to a recipient (such as, a person opposite the user).

In some embodiments, the virtual object may be dynamically displayed on the first video image. For example, the virtual object may be dynamically displayed along a first motion track on the first video image. By playing a first video sequence frame, the virtual object may be dynamically displayed on the first video image along a first motion track.

In an embodiment, virtual objects superimposed on video frame images of the first video image may be the same, so that the virtual object displayed on the first video image remains unchanged, and only a display position of the virtual object changes along the first motion track.

In another embodiment, virtual objects superimposed on video frame images of the first video image may be different. That is, the video frame images containing the virtual objects may be superimposed on the corresponding first video image in a virtual object change order. Thus, in displaying a virtual object on the first video image, the display position of the virtual object changes along the first motion track, and the virtual object changes along the first motion track. The change of image may include a change in size (for example, a change from large to small and a change from small to large), a change of display angle, a change in color (for example, color gradient), a change in style (for example, a change from a cartoon style to a realistic style), and the like, which is not limited herein. Therefore, a colorful and vivid display effect of the virtual object is achieved, thereby improving the video photographing quality and video interest. For example, if it is required to achieve a moving effect of the virtual object from far to near in a moving process, multiple video frame images corresponding to the virtual object may be superimposed on the first video image in an order of the size of the virtual object from small to large.

Figure 5:
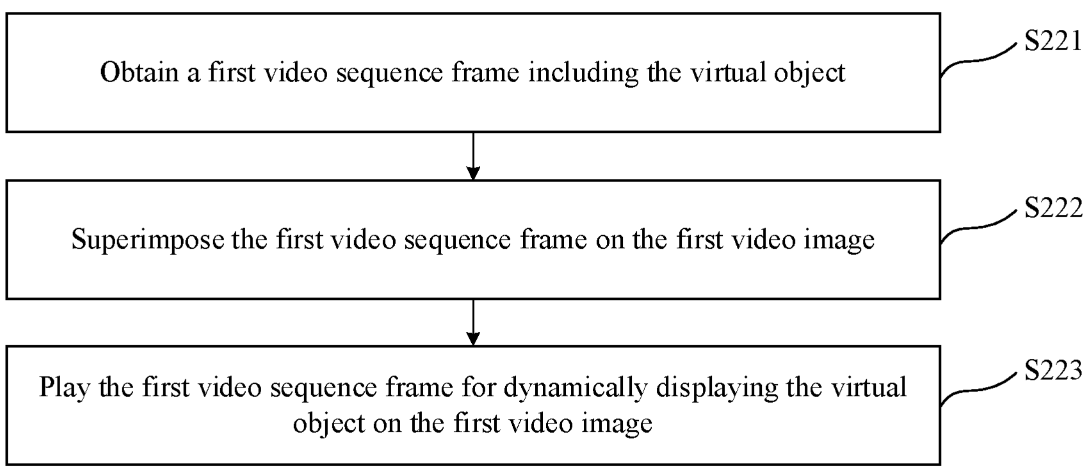
FIG. 5 shows a flow chart of step S220 in FIG. 2 according to an exemplary embodiment of the present disclosure.

In an embodiment, the virtual object may be dynamically displayed on the first video image based on a preset first video sequence frame including the virtual object. Specifically, reference is made to FIG. 5, which shows a flow chart of step S220 in FIG. 2 according to an exemplary embodiment of the present disclosure. The step S220 may include the following steps S221 to S223.

In step S221, a first video sequence frame including the virtual object is obtained.

In step S222, the first video sequence frame is superimposed on the first video image.

In step S223, the first video sequence frame is played for dynamically displaying the virtual object on the first video image.

The first video sequence frame may be stored locally in the terminal, and the terminal may obtain the first video sequence frame locally. In addition, the first video sequence frame may be stored in a server, and the terminal may obtain the first video sequence frame from the server, which is not limited in the embodiments.

In an embodiment, on detecting a virtual object display request, the terminal may obtain a first video sequence frame including the virtual object, superimpose and display the first video sequence frame on the first video image, and play the first video sequence frame, so that the virtual object may be dynamically displayed on the first video image.

In some embodiments, by playing the first video sequence frame, the virtual object may be moved from an initial position in the screen to an edge of the screen or from an edge of the screen to a center of the screen, or the virtual object may be keep stationary. In addition, the size of the virtual object may be dynamically changed in the first video image. For example, the size of virtual object may be changed from small to large, or from large to small, or from large to small and then to large again, which is not limited herein.

In some embodiments, the terminal may obtain position information of the virtual object in each of video frames of the first video sequence frame, and determine a first motion track of the virtual object on the first video image based on the position information. Thus, the virtual object is dynamically displayed on the first video image by: dynamically displaying the virtual object on the first video image along the first motion track.

The position information may be coordinates of the virtual object in each of the video frames in the video sequence frame. For example, taking a point in the video frame as a coordinate origin and taking a pixel as a unit, coordinates, that is position information, of a virtual object in a video frame may be determined. By sequentially superimposing a first video sequence frame on a corresponding frame of the first video image, the virtual object may move along the first motion track on the first video image acquired by the first photographing device.

The first motion track of the virtual object in the first video sequence frame may be preset according to actual requirements, so that the position information of the virtual object in different video frames of the first video sequence frame is not exactly the same. By playing the first video sequence frame, a dynamic display effect of the virtual object moving on the first video image can be achieved. In an embodiment, the position information may be preset according to a desired motion track. For example, in a case that the desired motion track is a motion track moving from a middle of the image to an edge of the image, position information of the virtual object in each of the video frames may be set from inside to outside. It should be noted that the edge of the image may be a contour of a certain object in the image or a boundary of an image canvas. The certain object may be any creature such as a human and an animal, or may be a non-creature such as a sculpture, a garment, a scene and a building, which is not limited herein.

In an embodiment, the first motion track of the virtual object may also be determined in real time based on an input of the user. For example, when the user triggers a virtual object display request, the user may input a required motion track, so that the virtual object is dynamically displayed on the first video image according to the motion track inputted by the user. In an embodiment, the motion track may be determined by detecting a touch operation performed by the user on at least one optional motion track displayed on the screen. For example, on detecting a touch operation performed on a virtual object display control, the terminal may display a request page. At least one optional motion track identifier may be displayed on the request page. Based on the motion track identifier selected by the user, a corresponding virtual object display request may be generated, so that the virtual object display request may include the motion track identifier selected by the user. Then, the terminal determines a motion track based on the virtual object display request and the motion track identifier selected by the user. In another embodiment, the motion track may be determined based on a track drawn by a gesture of the user across the air. In another embodiment, the motion track may be determined based on a sliding track of the user sliding on the screen. The manner of determining the motion track is not limited in the embodiments.

In some embodiments, the virtual object may be firstly displayed at an initial position on the first video image. By playing the first video sequence frame, the virtual object may move along the first motion track from the initial position on the first video image. Specifically, in an embodiment, on detecting that the first target object performs a preset trigger action, the terminal may determine a position at which the trigger action is performed, and determine the position at which the trigger action is performed as the initial position. Then, the terminal respectively displays (for example, superimposes and displays) the virtual object at an image position in the first video frame of the first video sequence frame and at a corresponding initial position, and determines position information of the virtual object in each of video frames of the first video sequence frame based on a relationship between the image position and the corresponding initial position to determine the corresponding first motion track. Thus, in displaying the virtual object on the first video image, the virtual object may be displayed at a position at which the first target object performs the preset trigger action, and is dynamically displayed on the first video image along the first motion track starting from this position.

For example, taking the preset trigger action as a blinking action, on detecting the user performs a blinking action, the terminal displays the virtual object at a position at which the blinking action is performed and then dynamically displays the virtual object on the first video image along the first motion track.

Figure 6:
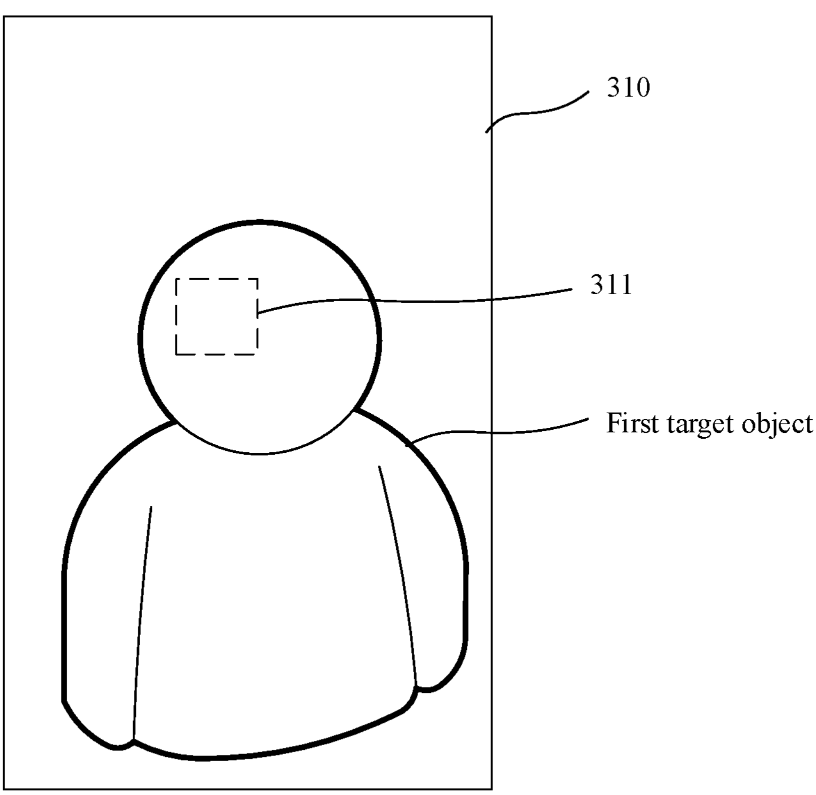
FIG. 6 shows a schematic diagram of an interface according to another exemplary embodiment of the present disclosure.

In an example, reference is made to FIG. 6, which shows a schematic diagram of an interface according to another exemplary embodiment of the present disclosure. As shown in FIG. 6, a photograph screen 310 on the screen corresponds to the first video image acquired by the first photographing device. On detecting that the first target object in the first video image performs a blinking action, the terminal displays the virtual object at an image position in a first video frame of the first video sequence frame a corresponding position 311 at which the blinking action is performed, so that the virtual object may be displayed at the position 311 at which the blinking action is performed. Accordingly, the virtual object is superimposed and displayed at the position 311 at which the first target object performs the blinking action, so that the virtual object is dynamically displayed on the first video image along a first motion track from the position 311.

Returning to FIG. 2, in the step S230, in a case that the virtual object enters into a preset state, switching is performed to acquire the second video image by using the second photographing device.

In some embodiments, that the virtual object enters into a preset state includes at least one of: that the first video sequence frame is played; that the virtual object is displayed at a certain position on the first video image; and that a parameter of the virtual object match a preset parameter.

In an embodiment, after the first video sequence frame is played, it may be determined that the virtual object enters into the preset state, so that after the virtual object is dynamically displayed, automatic switching may be performed to acquire the second video image by using the second photographing device, achieving an effect that the motion of the virtual object triggers switching between photographing screens.

In another embodiment, the terminal may detect a position of the virtual object displayed in the first video image. On detecting that the virtual object is displayed at a certain position on the first video image, it may be determine that the virtual object enters into the preset state. The certain position may be set according to actual requirements. For example, in a case that it is required to realize an effect that the virtual object moves to a position L at an edge in an image, the position L may be set as the certain position. When the virtual object is dynamically displayed on the first video image along the first motion track and moves to the position L, switching is performed to acquire the second video image by using the second photographing device, achieving the effect that switching between photographing devices is triggered when the virtual object moves to the edge of the image.

Apparently, the certain position may be preset in advance or defined by the user. For example, when the user triggers a virtual object display request, the certain location may be set. Further, when the user inputs a motion track, an end position of the motion track may be determined as the certain position. In addition, the certain position may be determined by performing image identification on the first video image. For example, a termination object may be set in advance, and it may be determined that the virtual object enters into the preset state on detecting that the virtual object moves into an image region where the termination object is located in the first video image. A termination position of the virtual object moving on the first video image is determined based on the termination object. The termination object may be set according to actual requirements, and may include a body part of the first target object, an object in the first video image, and the like, which is not limited herein. In a case that the termination object is a finger of the first target object, the first video sequence frame is played to cause the virtual object to move from an initial position in the screen to a position of the finger of the first target object, and switching is performed to acquire the second video image by using the second photographing device, thereby achieving the effect that switching between photographing devices is triggered when the virtual object moves to a certain position.

In another embodiment, the terminal may detect a parameter of the virtual object. In a case that it is detected that the parameter of the virtual object meets a preset parameter, it may be determined that the virtual object enters into the preset state. The parameter of virtual object may include a shape, a size, a display angle, a style, and the like. For example, a virtual object dynamically changing shapes (for example, from small to large) may be displayed on the first video image, and when the virtual object changes into a predetermined shape, it is determined that the virtual object enters into the preset state; and for another example, a virtual object dynamically changing shapes may be displayed on the first video image, and when the virtual object changes into a predetermined shape, it is determined that the virtual object enters into the preset state; which is not limited in the present disclosure.

In other embodiments, the terminal may determine whether the virtual object enters into the preset state by detecting a moving distance, a moving time instant and the like of the virtual object on the first video image.

In an embodiment, the terminal may calculate a moving distance of the virtual object moving from an initial position on the first video image. The moving distance may be calculated in pixels. For example, when the virtual object moves a predetermined distance on the first video image, it may be determined that the virtual object enters into the preset state. The predetermined distance may include a predetermined number of pixels, such as 30, 60, or 100 pixels, which is not limited herein.

In another embodiment, the terminal may determine whether the virtual object enters into the preset state based on a moving time instant of the virtual object. The moving time instant may be determined based on the number frames of the first video sequence. For example, the terminal may determine a frame on which the virtual object is superposed and displayed on the first video image for the first time as a first frame. When the virtual object is superposed and displayed on the first video image for an n-th time, it may be determined that the display object of the first video image enters into the preset state, where n may be any positive integer greater than 1. Therefore, after the virtual object is superposed and displayed on the n-th frame of the first video image, switching is performed between the photographing devices.

It should be understood that the preset state in which the switching between the photographing devices is triggered is not limited in the above embodiments, is not limited in the embodiments of the present disclosure, and is not exhaustive with considering the length of the specification.

Returning to FIG. 2, in step S240, the second video image is displayed on the screen.

In a case that the virtual object enters into a preset state, the terminal automatically switches the second photographing device to acquire the second video image, and displays the second video image on the screen.

In some embodiments, the terminal may display a virtual object on the second video image. The virtual object displayed on the second video image corresponds to the virtual object displayed on the first video image. The two virtual objects may be the same or different, which is not limited in the embodiments.

In an embodiment, it may be determined whether to display a virtual object on the second video image based on a special effect selection control triggered by the user, that is, based on a function corresponding to the special effect selection control. For example, in a case that a special effect selection control corresponds to a transfer function of the virtual object (where an effect achieved by performing the transfer function is to superimpose and display the virtual object on the first video image, and then superimpose and display the virtual object on the second video image after switching to the second photographing device to acquire the second video image), the virtual object is superimposed and displayed on the second video image, achieving an effect of continuously transferring the virtual object from the first video image to the second video image, thereby increasing the interest and richness of the video.

In an exemplary embodiment, when the terminal detects that an operation is performed on the special effect selection control corresponding the transfer function, the virtual object is superimposed and displayed on the first video image acquired by the first photographing device, and after it is switched to acquire the second video image by the second photographing device, the virtual object is superimposed and displayed on the second video image, thereby realizing continuous display of the virtual object visually. That is, the virtual object moves from the first video image acquired by the first photographing device to the second video image acquired by the second photographing device, thereby achieving an effect that the virtual object is transferred from the target object in the first video image to another target object in the second video image. Therefore, an innovative photographing interactive manner based on the automatic switching between the photographing devices, improving the photographing efficiency, and quality and interest of works.

Apparently, the above descriptions are only a function example. In the embodiments, multiple functions may be designed according to actual requirements and corresponding special effect selection controls may be configured, so that the user may trigger a special effect selection control to perform a corresponding function according to a required function or effect. That is, the embodiments are not limited to realizing the above functions.

Figure 7:
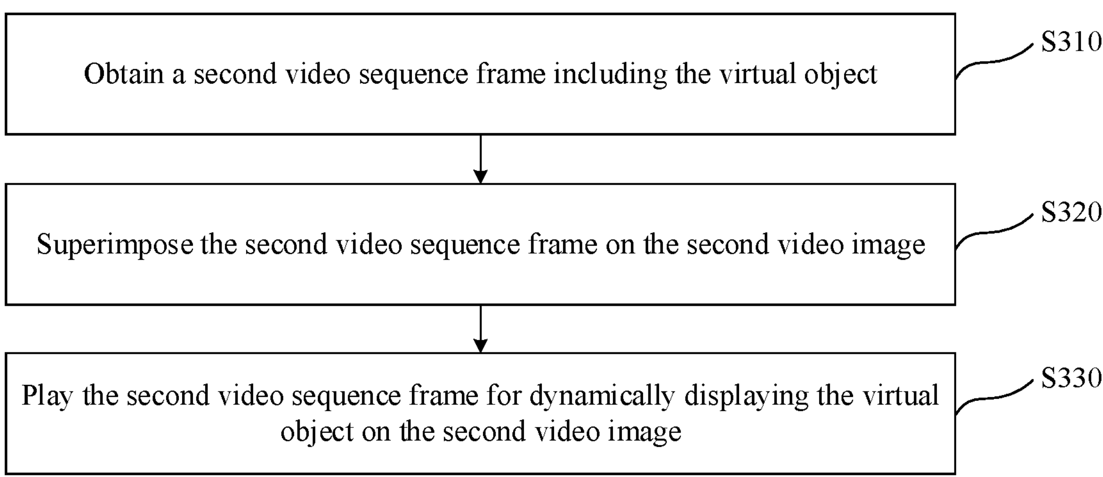
FIG. 7 shows a flow chart of displaying a virtual object on a second video image according to an exemplary embodiment of the present disclosure.

In some embodiments, in displaying the virtual object on the second video image, the virtual object may be dynamically displayed on the second video image. For example, the virtual object may be dynamically displayed on the second video image based on a pre-designed second video sequence frame of the virtual object. Specifically, reference is made to FIG. 7, which shows a flow chart of displaying a virtual object on a second video image according to an exemplary embodiment of the present disclosure. The method may include the following steps S310 to S330.

In step S310, a second video sequence frame including the virtual object is obtained.

In step S320, the second video sequence frame is superimposed on the second video image.

In step S330, the second video sequence frame is played for dynamically displaying the virtual object on the second video image.

It should be noted that the implementation of steps S310 to S330 is similar to the implementation of steps S221 to S223. The parts not described in detail may refer to the steps S221 to S223, and are not repeated herein.

In some embodiments, by playing the second video sequence frame, the virtual object may be moved from any position in the screen to the end position, such as from an edge of the screen to inside of the screen region, and the virtual object may be kept unmoved. In addition, the virtual object may dynamically change in size in the second video image. For example, the virtual object may change from large to small, thereby achieving an effect of the virtual object approaching the second target object in the screen from near to far in playing the second video sequence frame. Apparently, the virtual objects may change in size from large to small, or from large to small and then to large, and so on, which is not limited herein.

The second target object may be any creature such as a human and an animal, or may be a non-creature such as a sculpture, a garment, a scene and a building, which is not limited herein.

In an embodiment, on detecting a virtual object display request, the terminal may simultaneously obtain the second video sequence frame including the virtual object, and superimpose the second video sequence frame on the second video image, and then plays the second video sequence frame to dynamically display the virtual object on the second video image.

Exemplary, the terminal may predetermine a mapping relationship between the virtual object, the first video sequence frame and the second video sequence frame. On detecting a virtual object display request, the terminal may determine the virtual object to be displayed and the corresponding first video sequence frame and second video sequence frame, and plays the first video sequence frame and the second video sequence frame to dynamically display the same virtual object on the first video image acquired by the first photographing device and on the second video image acquired by the second photographing device, thereby achieving an effect that the virtual object is transferred from the target object in the first video image to the target object in the second video image.

In some embodiments, the terminal may obtain position information of the virtual object in each of video frames in the second video sequence frame, and determine a second motion track of the virtual object on the second video image based on the position information. Thus, the virtual object may be dynamically displayed on the second video image by: dynamically displaying the virtual object on the second video image along the second motion track.

In some embodiments, the virtual object may move from an initial position to a certain position in the second video image along the second motion track, that is, a position of the virtual object in a last video frame of the second video sequence frame is the certain position. For the convenience of expression, the position of the virtual object last displayed in the second video image is determined as an end position, that is, the certain position.

Any position may be set as the end position according to actual requirements. Alternatively, based on image identification performed on the second video image, a position corresponding to an identified preset end point object may be determined as the end position. The preset end point object is used for determining the end position of the virtual object moving on the second video image. The preset end point object may be set according to actual requirements, may include an object and a body part, such as a face, a lip, an eye, a forehead and a heart, of the second object, and is not limited herein. In displaying the second video image, a trigger action performed by the user on the second video image may be obtained, and a trigger position corresponding to the trigger action may be determined as the end position. That is, the end position is determined by a trigger action performed by the user. In an embodiment, an identifier or an image of the preset end point object indicating the end position may be stored corresponding to an object identifier of the virtual object. Then, after the virtual object is determined, the identifier or the image of the preset end point object indicating the end position may be determined, and then a position corresponding to the object identifier or the image is determined as the end position by performing image identification on the second video image.

In addition, in some embodiments, in a case that it is detected that there are multiple candidate second target objects in the second video image, it is further determined whether each of the multiple candidate second target objects performs a preset receive action, and a candidate second target object performs the preset receive action is determined as a second target object that actually receives a virtual object. The preset receiving action may be set according to the actual requirements. For example, the preset receiving action includes, but is not limited to, a beeping action, an action of drawing a heart with hands, and a blinking action.

In other embodiments, the detection of the second target object in the second video image may refer to the detection of the first target object in the first video image according to the above embodiments, and the principle is similar and is not repeated herein.

In some embodiments, in a case that the terminal simultaneously identifies multiple target objects in the second video image, the terminal may determine a second target object based on an occupied area of each of the target objects in the second video image. For example, a target object having a largest occupied area may be determined as a second target object, thereby determining the user closest to the second photographing device as the second target object.

In addition, in some embodiments, on detecting that the display object in the second video image meets a preset switching condition, the terminal may output a reception prompt information. The reception prompt information is used for prompting the second target object to prepare to respond to the virtual object. The reception prompt information may be in a voice form, such as "Please prepare to receive". Then, in a case that the preset switching condition is met, the terminal may play the voice of "Please prepare to receive" to prompt the user who are willing to cooperate, that is, the second target object, to start performance with the voice, thereby ensuring the photographing effect, photographing a video with tacit interaction and cooperation without repeated photographing, and improving the user's experience.

It should be noted that the parts not described in detail in the embodiments may refer to the previous embodiments, and are not repeated herein.

Therefore, with the image processing method according to the embodiments, based on the previous embodiments, the virtual object may be displayed on the first video image, and it is determined that the preset switching conditions are met in a case that the virtual object enters into the preset state, then switching is performed to acquire the second video image by using the second photographing device and the second video image is displayed on the screen. In some embodiments, the terminal may detect the first target object in the first video image, and dynamically display the virtual object along the first motion track on the first video image when the terminal detects that the first target object performs a preset trigger action, achieving a display effect of transmitting a virtual object from eyes when the user performs a blinking action or transmitting a virtual object from a mouth when the user performs a mouth-pouting action. After the virtual object enters into the preset state, switching is performed to acquire the second video image by using the second photographing device, and the second video image is displayed on the screen. In addition, in some embodiments, the virtual object may be dynamically displayed on the second video image, so that the virtual object continuously moves on the second video image acquired by using the second photographing device. Therefore, the user may trigger displaying a virtual object by performing a preset trigger action, finally achieving a visual effect of the virtual object moving in video images acquired by different photographing devices, providing the user with photographing possibilities, and improving the user's interest and experience in photographing videos.

In addition, in some embodiments, when the virtual object is displayed at the end point of the second video image, the terminal may trigger a preset special effect corresponding to or associated with the virtual object. The server or the terminal may preset at least one special effect, and establish a mapping relationship between virtual objects, special effects, and special effect trigger conditions. When it is detected that a special effect trigger condition corresponding to a virtual object is met, the special effect corresponding to the virtual object may be obtained from the server or the terminal locally and played.

Apparently, playback of special effects may be triggered by other conditions. The terminal may trigger and play a special effect corresponding to the virtual object at different time instants. In acquiring a video image, the terminal may trigger one or more playbacks of special effects, and a virtual object may correspond to or be associated with one or more special effects. The special effect triggered each time may be the same or different, which is not limited in the embodiments. For example, when the virtual object enters into the preset state, the terminal may play a special effect corresponding to the virtual object. In an embodiment, a special effect of the virtual object may be played when switching photographing devices.

In some embodiments, the special effect may include at least one of a visual effect and an audio effect. The visual effect may be superimposed on the second video image to show a dynamic display effect. The audio effect is a piece of audio. The specific type and content of the special effect are not limited in the present disclosure.

Figure 8:
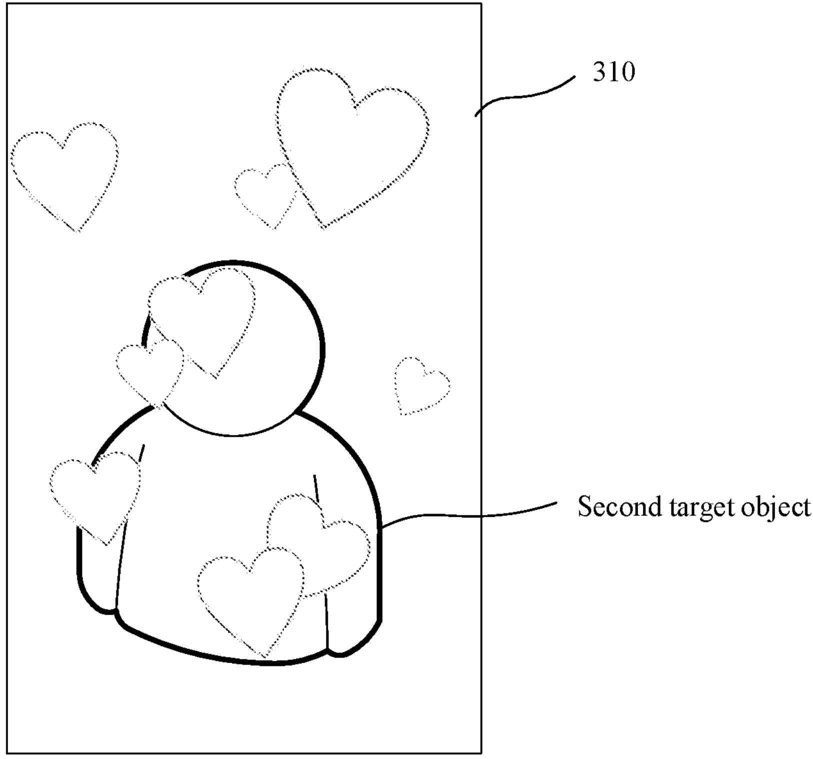
FIG. 8 shows a schematic diagram of an interface according to another exemplary embodiment of the present disclosure.

In some embodiments, the special effect corresponding to the virtual object may include a sequence frame including multiple frames of images dynamically displayed on the screen by multiple virtual objects. Taking the virtual object as a love, the special effect corresponding to the virtual object may be a sequence frame having a display effect of multiple loves moving on the screen, such as a sequence frame having a display effect of multiple loves floating upward. In an embodiment, the multiple hearts may be set based on the full screen, so that a dreamy love atmosphere is appear on the full screen when playing the special effect, as shown in FIG. 8. In another embodiment, the multiple hearts may be set only based on some regions of the screen, which is not limited herein. Therefore, the presentation and richness of video production effects are improved, the enthusiasm of the user is stimulated, the interest of videos is improved, and the social interaction of photographing is enhanced.

Figure 9:
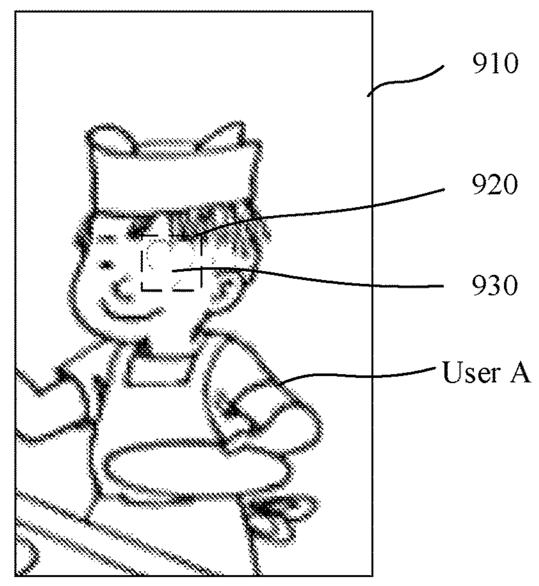
FIG. 9 shows a schematic diagram of a screen at four different time instants according to an exemplary embodiment of the present disclosure.
Figure 9:
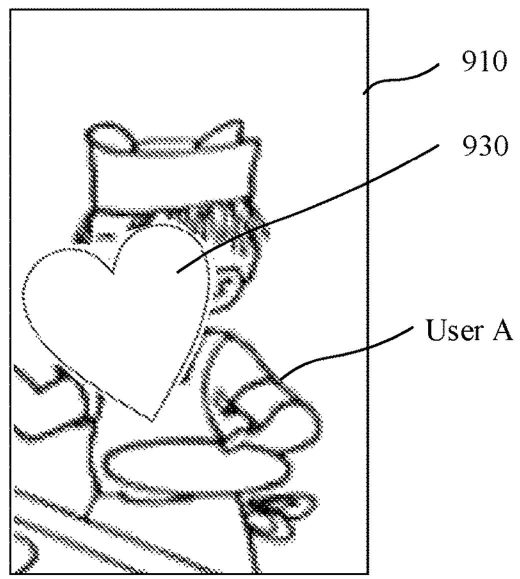
Figure 9:
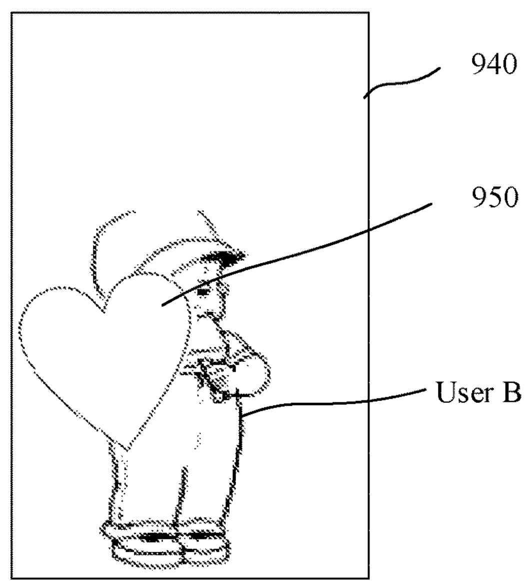
Figure 9:
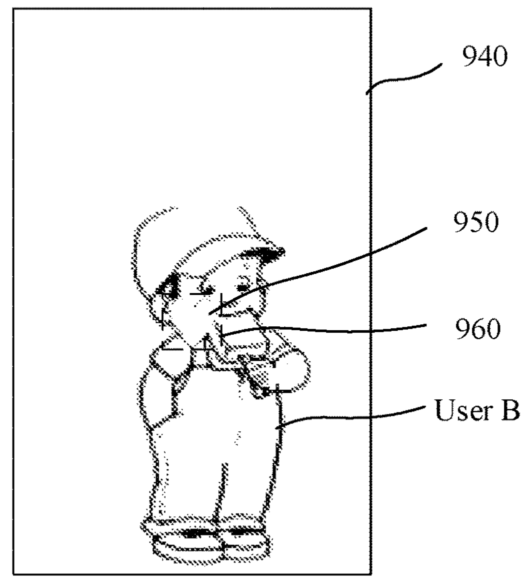

In an application scenario, reference is made to FIG. 9, which shows a schematic diagram of a screen at four different time instants according to an exemplary embodiment of the present disclosure. Taking the virtual object is a love, FIGS. 9(*a*) to 9(*d*) show schematic diagrams of a screen respectively at four time instants T1, T2, T3 and T4. At time instants T1 and T2, the screen displays a first video image 910 acquired by the first photographing device. At time instants T3 and T4, the screen displays a second video image 920 acquired by the second photographing device after performing switching between photographing devices. The first photographing device identifies that user A is performing a blinking action at the time instant T1, then determines a position of an eye where the blinking action is performed as an initial position 920 of the virtual object (displayed corresponding to an image position of the virtual object in a first video frame of a first video sequence frame), and plays a first video sequence frame to move a love 930 from the position of the eye. At the time instant T2, the display on the screen is as shown in FIG. 9(*b*), and the terminal determines whether the first video sequence frame has been played. In a case that the first video sequence frame has been played, switching is performed to acquire images by the second photographing device, and the screen displays a second video image 940 acquire by the second photographing device. In the second video image, a person, such as user B, opposite the user A is captured, and a second video sequence frame is played. From the time instant T3 to the time instant T4, a love 950 in the second video sequence frame moves from an edge of the screen to a face of the user B, that is, to an end position 960, and a change of the love in size from large to small is displayed. Thus, a love transmission effect of the love, that is transmitted from the position of the eye at which the blinking action is performed of the user A in front of a photographing device on a side of the terminal to the face of the user B in front of a photographing device on the other side of the terminal, is achieve.

In some examples, after the second video sequence frame is played, a third video sequence frame may be played to display a special effect, including a visual effect and an audio effect, associated with the love of the virtual object. After the time instant T4, the schematic diagram of the special effect playing on the screen may be shown as FIG. 8, thereby realizing an effect of multiple hearts floating upward after the love moves to the face of the user B.

In addition, in some embodiments, after switching is performed to acquire the second video image by using the second photographing device of the terminal, deformation processing may be performed on the second target object acquired by the second photographing device. In some embodiments, after switching is performed to acquire the second video image by using the second photographing device of the terminal and the second video image is displayed on the screen, the terminal may perform deformation processing on an image in the second video image corresponding to the second target object in the second video image, that is, deformation processing is triggered after performing switching between the photographing devices. Thus, the second target object is deformed on the second video image. In other embodiments, the terminal may perform deformation processing on an image of the second target object on the second video image when the virtual object is displayed at the end position of the second video image, that is, deformation processing is triggered when the virtual object moves to the end position.

The deformation processing is performed on the image of the second target object on the second video image by: obtaining deformation processing configuration of the second target object, where the deformation processing configuration may include a deformation type; obtaining a to-be-deformed key point corresponding to the second target object; and determining a position corresponding to the to-be-deformed key point after the deformation processing based on the deformation type, moving the to-be-deformed key point to the position to obtain a second video image of the second target object after the deformation processing, and displaying the second video image, where a visual effect of the second target object being deformed on the second video image is achieved. In addition, the deformation processing configuration may include a deformation degree corresponding to the deformation type. In determining a position corresponding to the to-be-deformed key point after the deformation processing based on the deformation type, the position corresponding to the to-be-deformed key point after the deformation processing may be calculated based on the deformation type and the corresponding deformation degree. The deformation type may be one or a combination of zoom in, zoom out, translation, rotation and drag. Accordingly, the deformation degree may include, for example, zoom in/zoom out multiples, a translation distance, a rotation angle and a drag distance.

In some embodiments, the deformation processing configuration may include a to-be-deformed part. The obtaining a to-be-deformed key point corresponding to the second target object may include: obtaining a key point related to the to-be-deformed part of the second target object as the to-be-deformed key point.

The deformation processing configuration may be set according to actual requirements, and may include one or more to-be-deformed part. For each of to-be-deformed parts, one or more deformation types may be configured. In a case that the deformation processing configuration includes multiple to-be-deformed parts and at least two to-be-deformed parts correspond to different deformation types, deformation processing corresponding to the different deformation types may be performed on different to-be-deformed parts of the second target object, thereby enriching deformation effects by setting the deformation processing configuration according to actual requirements. It should be noted that, before setting the to-be-deformed part, the to-be-deformed part may be a default part, and the default part may be preset or defined by the user. For example, the default part may be a face, an eye, a nose, a lip, and the like of the second target object, which is not limited herein.

In some embodiments, the deformation processing configuration may be set based on a deformation effect required to be presented, and may be stored in a deformation database with the corresponding visual effect required to be presented. The deformation database may store a mapping relationship between one or more deformation processing configurations and corresponding deformation effects, and the deformation database may be stored in the terminal locally or a server. The deformation effect may be expressions such as a shy expression and an angry expression, or an image deformation effect (such as a face stretching effect), or any other effect involving a change of the position of the key point, which is not limited herein. For example, for a deformation effect such as the shy expression, a position relationship between key points on the face of the user showing a shy expression may be determined by learning a large number of pictures of shy expressions, so that a deformation type and a deformation degree of each of corresponding to-be-deformed parts are determined. Then, a deformation processing configuration corresponding to the shy expression is obtained, and a mapping relationship between identifiers corresponding to the shy expressions and deformation processing configurations corresponding to the shy expressions is constructed and stored in the deformation database. In an embodiment, the user may select a desired deformation effect before or during photographing. After a corresponding selection operation is detected, an identifier corresponding to the deformation effect selected by the user may be obtained, and a corresponding deformation processing configuration may be found from the deformation database, thus obtaining the deformation processing configuration of the second target object.

Figure 10:
FIG. 10 shows a schematic diagram of an interface according to another exemplary embodiment of the present disclosure.

In an example, taking the to-be-deformed part as the face, after the terminal performs switching to acquire the second video image by using the second photographing device, deformation processing may be performed on a face of the second target object acquired by the second photographing device. As shown in FIG. 10, based on the example shown in FIG. 9, FIG. 10 shows a schematic diagram of an interface of the screen at a time instant T5 after the time instant T4 in FIG. 9. In the example shown in FIG. 10, on detecting that the virtual object is displayed at the end point of the second video image, the terminal may perform deformation processing on the face of the second target object to present a corresponding deformation effect.

Figure 11:
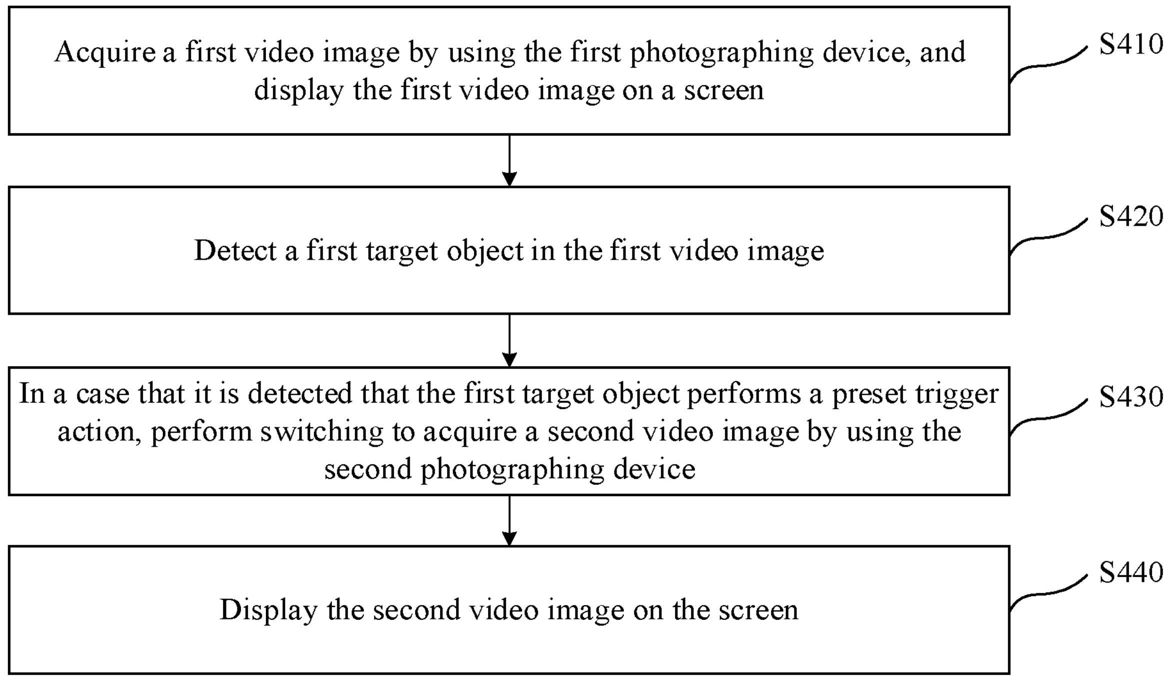
FIG. 11 shows a flow chart of an image processing method according to another embodiment of the present disclosure.

In addition, in some embodiments, the terminal may detect a first target object in the first video image and trigger the switching of the photographing devices based on the first target object. Specifically, reference is made to FIG. 11, which shows a flow chart of an image processing method according to another embodiment of the present disclosure. In the embodiment, the method may include the following steps S410 to S440.

In step S410, a first video image is acquired by using a first photographing device, and the first video image is displayed on a screen.

In step S420, a first target object in the first video image is detected.

In step S430, in a case that it is detected that the first target object performs a preset trigger action, switching is performed to acquire a second video image by using a second photographing device.

In step S440, the second video image is displayed on the screen.

For the implementation of the steps S420 and S430, one may refer to the description of the step S220 in the previous embodiments, and the implementations are almost the same. The difference is that in the implementation of the step S220, the first target object performs the preset trigger action to trigger displaying a virtual object on the first video image, and in the embodiment, the first target object performs the preset trigger action as a preset switching condition to control the switching between the photographing devices. That is, based on the trigger operation performed by the first target object in the first video image, the first photographing device is switched to the second photographing device, thereby providing a flexible photographing manner for the user and improving the operation experience.

In the embodiments, according to actual requirements, a virtual object may be displayed on the first video image or on the second video image, which is not limited herein. Relevant implementations may refer to the descriptions of corresponding parts in the above embodiments, and are not repeated herein.

It should be noted that the parts not described in detail in the embodiment refer to the previous embodiments, and are not repeated herein.

Therefore, with the image processing method according to the embodiment, the terminal may detect the first target object in the first video image, performs switching to acquire the second video image by using the second photographing device when the terminal detects that the first target object in the first video image performs a preset trigger action, and display the second video image on the screen. For example, taking the preset trigger action as a blink action, when it is detected that the user performs a blinking action, switching between different photographing devices is performed to acquire video images, and the video images are displayed.

Figure 12:
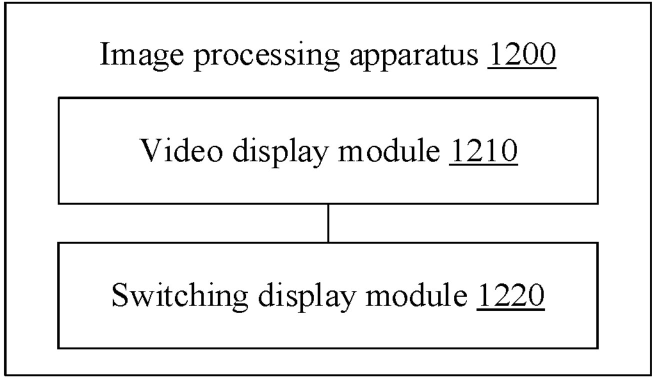
FIG. 12 shows a block diagram of an image processing apparatus according to an embodiment of the present disclosure.

Reference is made to FIG. 12, which shows a block diagram of an image processing apparatus according to an embodiment of the present disclosure. The image processing apparatus 1200 may be applied to a terminal including a first photographing device and a second photographing device. Specifically, the apparatus may include: a video display module 1210 and a switching display module 1220.

The video display module 1210 is configured to acquire a first video image by using the first photographing device, and display the first video image on a screen.

The switching display module 1220 is configured to, in a case that it is detected that a display object in the first video image meets a preset switching condition, perform switching to acquire a second video image by using the second photographing device, and display the second video image on the screen.

In an embodiment, the image processing apparatus 1200 further includes a first virtual object display module. The first virtual object display module is configured to display a virtual objects on the first video image. Accordingly, the switching display module 1220 may include: a first trigger switching sub module. The first trigger switching sub module is configured to, in a case that the virtual object meets a preset state, perform switching to acquire the second video image by using the second photographing device.

In an embodiment, the image processing apparatus 1200 further includes a first target object detection module. The first target object detection module is configured to detect a first target object in the first video image. Accordingly, the first virtual object display module may include a first virtual object display sub module. The first virtual object display sub module is configured to, in a case that it is detected that the first target object in the first video image performs a preset trigger action, display the virtual object on the first video image.

In an embodiment, the first virtual object display module may include: a first sequence frame obtaining sub module, a first sequence frame superimposing sub module, and a first sequence frame playing sub module. The first sequence frame obtaining sub module is configured to obtain a first video sequence frame including the virtual object. The first sequence frame superimposing sub module is configured to superimpose the first video sequence frame on the first video image. The first sequence frame playing sub module is configured to play the first video sequence frame for dynamically displaying the virtual object on the first video image.

In an embodiment, the image processing apparatus 1200 further includes: a first position information obtaining module and a first motion track determination module. The first position information obtaining module is configured to obtain position information of the virtual object in each of video frames of the first video sequence frame. The first motion track determination module is configured to determine a first motion track of the virtual object on the first video image based on the position information. Accordingly, the first sequence frame playing sub module may include a first sequence frame playing unit. The first sequence frame playing unit is configured to play the first video sequence frame for dynamically displaying the virtual object on the first video image along the first motion track.

In an embodiment, that the virtual object meets a preset state includes: that the virtual object is displayed at a certain position in the first video image.

In an embodiment, the image processing apparatus 1200 further includes a target object detection module. The target object detection module is configured to detect a first target object in the first video image. Accordingly, the switching display module 1220 may include a second trigger switching module. The second trigger switching module is configured to, in a case that it is detected that the first target object performs a preset trigger action, perform switching to acquire the second video image by using the second photographing device.

In an embodiment, the image processing apparatus 1200 further includes a second virtual object display module. The second virtual object display module is configured to display the virtual object on the second video image.

In an embodiment, the second virtual object display module includes: a second sequence frame obtaining sub module, a second sequence frame superimposing sub module and a second sequence frame playing sub module. The second sequence frame obtaining sub module is configured to obtain a second video sequence frame including the virtual object. The second sequence frame superimposing sub module is configured to superimpose the second video sequence frame on the second video image. The second sequence frame playing sub module is configured to play the second video sequence frame for dynamically displaying the virtual object on the second video image.

In an embodiment, the image processing apparatus 120 further includes a second position information obtaining module and a second motion track determination module. The second position information obtaining module is configured to obtain position information of the virtual object in each of video frames in the second video sequence frame. The second motion track determination module is configured to determine a second motion track of the virtual object on the second video image based on the position information. Accordingly, the second sequence frame playing sub module may include: a second sequence frame playing unit. The second sequence frame playing unit is configured to play the second video sequence frame for dynamically displaying the virtual object on the second video image along the second motion track.

The image processing apparatus according to the embodiments of the present disclosure may perform the image processing method according to the embodiments of the present disclosure, and the implementation principle of the image processing apparatus is similar to the implementation principle of the image processing method. The actions performed by each of the modules in the image processing apparatus according to the embodiments of the present disclosure correspond to the steps in the image processing method according to the embodiments of the present disclosure. For the detailed functional descriptions of each of the modules in the image processing apparatus, one may refer to the descriptions of the corresponding image processing method according to the above embodiments of the present disclosure, which are not repeated herein.

Hereinafter, reference is made to FIG. 13, which shows a schematic structural diagram of an electronic device 1300 suitable for implementing the embodiments of the present disclosure. The electronic devices according to the embodiments of the present disclosure may include, but are not limited to, terminals such as computers and mobile phones. The electronic device shown in FIG. 13 is only exemplary, and should not indicate any limitation to the function and application scope of the embodiments of the present disclosure.

The electronic device 1300 includes: a memory and a processor. The memory stores a program for performing the method according to the above method embodiments. The processor is configured to perform the program stored in the memory. The processor may be referred to as a processing device 1301 described below. The memory may include at least one of a read only memory (ROM) 1302, a random access memory (RAM) 1303, and a memory device 1308. Detail descriptions are provided as follows.

Figure 13:
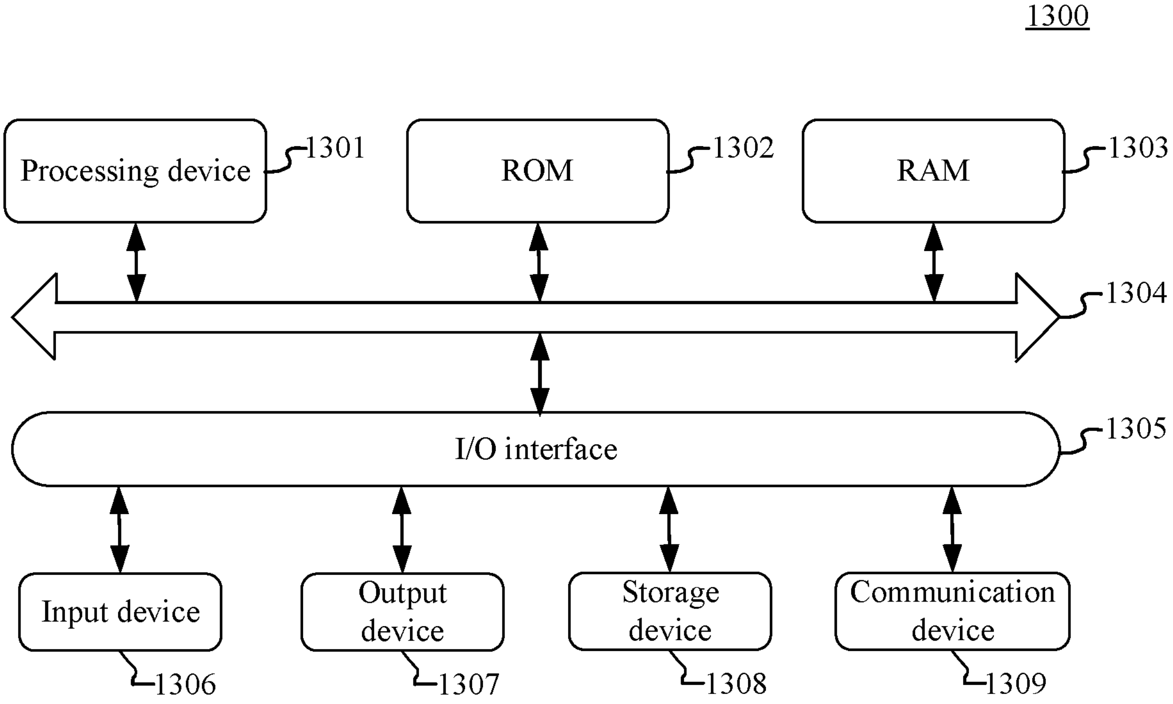
FIG. 13 shows a schematic structural diagram of an electronic device according to an embodiment of the present disclosure.

As shown in FIG. 13, the electronic device 1300 may include a processing device 1301 (such as a central processor and a graphics processor) which may execute various operations and processing through a program stored in a Read Only Memory (ROM) 1302 or a program loaded from the storage device 1308 into a Random Access Memory (RAM) 1303. The RAM 1303 is further configured to store various programs and data required by the electronic device 1300. The processing device 1301, the ROM 1302 and the RAM 1303 are connected to each other through a bus 1304. An Input/output (I/O) interface 1305 is also connected to the bus 1304.

Generally, the I/O interface 1305 may be connected to: an input device 1306, such as a touch screen, a touch panel, a keyboard, a mouse, a camera, a microphone, an accelerometer, and a gyroscope; an output device 1307, such as a liquid crystal display (LCD), a speaker, and a vibrator; a storage device 1308 such as a magnetic tape and a hard disk; and a communication device 1309. The communication device 1309 enables the electronic device 1300 to perform wireless or wired communication with other devices for data exchanging. Although FIG. 13 shows an electronic device 1300 having various components, it should be understood that the illustrated components are not necessarily required to all be implemented or included. Alternatively, more or fewer components may be implemented or included.

Particularly, according to an embodiment of the present disclosure, the process described above in conjunction with flow charts may be implemented as a computer program. For example, a computer program product is further provided in an embodiment in the present disclosure, including a computer program carried on a non-transitory computer readable storage medium. The computer program includes program codes for performing the method shown in the flow charts. In the embodiment, the computer program may be downloaded and installed from the network via the communication device 1309, or installed from the storage device 1308, or installed from the ROM 1302. When the computer program is executed by the processing device 1301, the above-mentioned functions defined in the method according to the embodiments of the present disclosure are performed.

It should be noted that, the computer readable medium mentioned herein may be a computer readable signal medium or a computer readable storage medium or any combination thereof. The computer readable storage medium may be, but is not limited to, a system, an apparatus, or a device in an electronic, magnetic, optical, electromagnetic, infrared, or semi-conductive form, or any combination thereof. The computer readable storage medium may be, but is not limited to, an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), a light storage device, a magnetic storage device or any combination thereof. In the present disclosure, the computer readable storage medium may be any tangible medium containing or storing a program, and the program may be used by or in combination with an instruction execution system, apparatus, or device. In the present disclosure, the computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium and can send, propagate or transmit programs to be used by or with an instruction execution system, apparatus or device. The program codes stored in the computer readable storage medium may be transmitted via any proper medium including but not limited to: wired, optical fiber cable, radio frequency (RF), or any suitable combination of the foregoing.

In some embodiments, the client and the server may perform communication using any currently known or future developed network protocol such as HTTP (HyperText Transfer Protocol), and may be interconnected with any form or medium of digital data communication (for example, a communication network). The communication network embodiments include local area networks ("LANs"), wide area networks ("WANs"), internet, end-to-end networks (for example, ad hoc end-to-end networks), and any networks currently known or developed in the future.

The computer readable storage medium may be incorporated in the electronic device, or may exist independently without being assembled into the electronic device.

The computer readable storage medium carries one or more programs. The one or more programs, when being executed by the electronic device, cause the electronic device to: acquire a first video image by using the first photographing device, and display the first video image on a screen; and in a case that it is detected that a display object in the first video image meets a preset switching condition, perform switching to acquire a second video image by using the second photographing device, and display the second video image on the screen.

Computer program code for performing operations of the present disclosure may be written in one or more programming languages, or a combination of the foregoing, and the programming language includes, but is not limited to, object oriented programming languages, such as Java, Smalltalk, and C++, also includes conventional procedural programming languages, such as "C" language or similar programming languages. The program codes may be executed entirely on a user's computer, or be executed partly on the user's computer, or be executed as a stand-alone software package, or be executed partly on the user's computer and partly on a remote computer, or be executed entirely on the remote computer or server. In a case that the execution of the program code involves a remote computer, the remote computer may be connected to a user's computer via any kind of network, including a local area network (LAN) or a wide area network (WAN), or may be connected to an external computer (for example, via an Internet providing by an Internet service provider).

The flow charts and schematic diagrams in the Figures shows the architecture, functionality and operation of possible implementations of the products of system, method and computer program provided according to the embodiments of the present disclosure. Each block in the flow charts or schematic diagrams can represent a module, a program segment, or a part of code, and the module, the program segment, or the part of code includes one or more executable instructions for implementing specified logical functions. It should be noted that in some alternative implementations, the functions noted in the blocks may be implemented in a different order than those illustrated in the Figures. For example, two blocks shown in succession may in fact be executed substantially in parallel, and they may sometimes be executed in a reverse order, depending upon the functionality involved. It also should be noted that each block in the schematic diagrams and/or flow charts, and combinations of blocks in the schematic diagrams and/or flowcharts, can be implemented by a dedicated hardware-based system which is configured to implement specified functions or operations, or can be implemented by using a combination of dedicated hardware and computer instructions.

The modules or units mentioned in the description of the embodiments of the present disclosure may be implemented by means of software, or otherwise by means of hardware. In some circumstances, the name of a module or a unit does not constitute a limitation on the module or the unit itself. For example, a video display module may also be described as "a module for displaying a video image".

The functions described above in this application may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD) and so on.

In the present disclosure, the computer-readable storage medium may be a tangible medium, which may contain or store a program used by the instruction execution system, apparatus, or device or a program used in combination with the instruction execution system, apparatus, or device. The computer-readable medium may be a machine-readable signal medium or a machine-readable storage medium. The computer-readable medium may include, but is not limited to, an electronic, magnetic, optical, electromagnetic, infrared, or semiconductor system, apparatus or device, or any suitable combination of thereof. The machine-readable storage media, for example, includes an electrical connection based on one or more wires, a portable computer disk, a hard drive, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of thereof.

According to one or more embodiments of the present disclosure, an image processing method is provided. The image processing method is applied to a first terminal. The method includes: acquiring a first video image by using the first photographing device, and displaying the first video image on a screen; and in a case that it is detected that a display object in the first video image meets a preset switching condition, performing switching to acquire a second video image by using the second photographing device, and displaying the second video image on the screen.

In an embodiment, the method further includes: displaying a virtual object on the first video image; and the in a case that it is detected that a display object in the first video image meets a preset switching condition, performing switching to acquire a second video image by using the second photographing device includes: in a case that the virtual object meets a preset state, performing switching to acquire the second video image by using the second photographing device.

In an embodiment, the method further includes: detecting a first target object in the first video image; and the displaying a virtual object on the first video image includes: in a case that it is detected that the first target object in the first video image performs a preset trigger action, displaying the virtual object on the first video image.

In an embodiment, the displaying a virtual object on the first video image includes: obtaining a first video sequence frame including the virtual object; superimposing the first video sequence frame on the first video image; and playing the first video sequence frame for dynamically displaying the virtual object on the first video image.

In an embodiment, the method further includes: obtaining position information of the virtual object in each of video frames in the first video sequence frame; determining a first motion track of the virtual object on the first video image based on the position information; and the dynamically displaying the virtual object on the first video image includes: dynamically displaying the virtual object on the first video image along the first motion track.

In an embodiment, that the virtual object meets a preset state includes that the virtual object is displayed at a certain position in the first video image.

In an embodiment, the method further includes: detecting a first target object in the first video image; and the in a case that it is detected that a display object in the first video image meets a preset switching condition, performing switching to acquire a second video image by using the second photographing device includes: in a case that it is detected that the first target object performs a preset trigger action, performing switching to acquire the second video image by using the second photographing device.

In an embodiment, the method further includes: displaying the virtual object on the second video image.

In an embodiment, the displaying the virtual object on the second video image includes: obtaining a second video sequence frame including the virtual object; superimposing the second video sequence frame on the second video image; and playing the second video sequence frame for dynamically displaying the virtual object on the second video image.

In an embodiment, the method further includes: obtaining position information of the virtual object in each of video frames in the second video sequence frame; determining a second motion track of the virtual object on the second video image based on the position information; and the dynamically displaying the virtual object on the second video image includes: dynamically displaying the virtual object on the second video image along the second motion track.

According to one or more embodiments of the present disclosure, an image processing apparatus is provided. The image processing apparatus may be applied to a terminal. The terminal includes a first photographing device and a second photographing device that are arranged on different sides of the terminal. The apparatus may include: a video display module and a switching display module. The video display module is configured to acquire a first video image by using the first photographing device, and display the first video image on a screen. The switching display module is configured to, in a case that it is detected that a display object in the first video image meets a preset switching condition, perform switching to acquire a second video image by using the second photographing device, and display the second video image on the screen.

In an embodiment, the image processing apparatus further includes a first virtual object display module. The first virtual object display module is configured to display a virtual objects on the first video image. Accordingly, the switching display module may include: a first trigger switching sub module. The first trigger switching sub module is configured to, in a case that the virtual object meets a preset state, perform switching to acquire the second video image by using the second photographing device.

In an embodiment, the image processing apparatus further includes a first target object detection module. The first target object detection module is configured to detect a first target object in the first video image. Accordingly, the first virtual object display module may include a first virtual object display sub module. The first virtual object display sub module is configured to, in a case that it is detected that the first target object in the first video image performs a preset trigger action, display the virtual object on the first video image.

In an embodiment, the first virtual object display module may include: a first sequence frame obtaining sub module, a first sequence frame superimposing sub module, and a first sequence frame playing sub module. The first sequence frame obtaining sub module is configured to obtain a first video sequence frame including the virtual object. The first sequence frame superimposing sub module is configured to superimpose the first video sequence frame on the first video image. The first sequence frame playing sub module is configured to play the first video sequence frame for dynamically displaying the virtual object on the first video image.

In an embodiment, the image processing apparatus further includes: a first position information obtaining module and a first motion track determination module. The first position information obtaining module is configured to obtain position information of the virtual object in each of video frames of the first video sequence frame. The first motion track determination module is configured to determine a first motion track of the virtual object on the first video image based on the position information. Accordingly, the first sequence frame playing sub module may include a first sequence frame playing unit. The first sequence frame playing unit is configured to play the first video sequence frame for dynamically displaying the virtual object on the first video image along the first motion track.

In an embodiment, that the virtual object meets a preset state includes: that the virtual object is displayed at a certain position in the first video image.

In an embodiment, the image processing apparatus further includes a target object detection module. The target object detection module is configured to detect a first target object in the first video image. Accordingly, the switching display module may include a second trigger switching module. The second trigger switching module is configured to, in a case that it is detected that the first target object performs a preset trigger action, perform switching to acquire the second video image by using the second photographing device.

In an embodiment, the image processing apparatus further includes a second virtual object display module. The second virtual object display module is configured to display the virtual object on the second video image.

In an embodiment, the second virtual object display module includes: a second sequence frame obtaining sub module, a second sequence frame superimposing sub module and a second sequence frame playing sub module. The second sequence frame obtaining sub module is configured to obtain a second video sequence frame including the virtual object. The second sequence frame superimposing sub module is configured to superimpose the second video sequence frame on the second video image. The second sequence frame playing sub module is configured to play the second video sequence frame for dynamically displaying the virtual object on the second video image.

In an embodiment, the image processing apparatus further includes a second position information obtaining module and a second motion track determination module. The second position information obtaining module is configured to obtain position information of the virtual object in each of video frames in the second video sequence frame. The second motion track determination module is configured to determine a second motion track of the virtual object on the second video image based on the position information. Accordingly, the second sequence frame playing sub module may include: a second sequence frame playing unit. The second sequence frame playing unit is configured to play the second video sequence frame for dynamically displaying the virtual object on the second video image along the second motion track.

The above description includes merely preferred embodiments of the present disclosure and explanations of technical principles used. Those skilled in the art should understand that the scope of the present disclosure is not limited to technical solutions formed by a specific combination of the above technical features, but covers other technical solutions formed by any combination of the above technical features or equivalent features thereof without departing from the concept of the present disclosure. For example, a technical solution formed by interchanging the above features with technical features having similar functions as disclosed (but not limited thereto) is also covered in the scope of the present disclosure.

In addition, although the operations are described in a specific order, it should not be understood that these operations are to be performed in the specific order shown or performed in a sequential order. Under certain circumstances, multitasking and parallel processing may be advantageous. Although the specific implementation details are described above, these implementation details should not be construed as limiting the scope of the present disclosure. The features described in multiple separate embodiments may be implemented in combination in a separate embodiment. Conversely, the features described in a separate embodiment may be implemented in multiple embodiments individually or in any suitable sub-combination. Although the subject matter has been described in language specific to structural features and/or logical actions of the method, it should be understood that the subject matter defined in the appended claims are unnecessarily limited to the specific features or actions described above. The specific features and actions described above are merely exemplary forms of implementing the claims.

What is claimed is:

1. An image processing method, applied to a terminal, wherein the terminal comprises a first photographing device and a second photographing device, and the method comprises:

acquiring a first video image by using the first photographing device, and displaying the first video image on a screen;

displaying a virtual object selection page where a virtual object request display control corresponding to a virtual object is displayed;

displaying the virtual object on the first video image, wherein a state of the virtual object changes dynamically;

in a case that it is detected that a display object in the first video image meets a preset switching condition, performing switching to acquire a second video image by using the second photographing device, and displaying the second video image on the screen;

displaying the virtual object on the second video image;

combining the first video image and the second video image into a combined video image, and displaying the combined video image, wherein the in a case that it is detected that a display object in the first video image meets a preset switching condition, performing switching to acquire a second video image by using the second photographing device comprises:

in a case that the virtual object meets a preset state, performing switching to acquire the second video image by using the second photographing device.

2. The method according to claim 1, further comprising:

detecting a first target object in the first video image;

wherein the displaying a virtual object on the first video image comprises:

in a case that it is detected that the first target object in the first video image performs a preset trigger action, displaying the virtual object on the first video image.

3. The method according to claim 1, wherein the displaying a virtual object on the first video image comprises:

obtaining a first video sequence frame comprising the virtual object;

superimposing the first video sequence frame on the first video image; and playing the first video sequence frame for dynamically displaying the virtual object on the first video image.

4. The method according to claim 3, further comprising:

obtaining position information of the virtual object in each of video frames in the first video sequence frame; and determining a first motion track of the virtual object on the first video image based on the position information;

wherein the dynamically displaying the virtual object on the first video image comprises:

dynamically displaying the virtual object on the first video image along the first motion track.

5. The method according to claim 1, wherein that the virtual object meets a preset state comprises:

that the virtual object is displayed at a certain position in the first video image.

6. The method according to claim 1, further comprising:

detecting a first target object in the first video image;

wherein the in a case that it is detected that a display object in the first video image meets a preset switching condition, performing switching to acquire a second video image by using the second photographing device comprises:

in a case that it is detected that the first target object performs a preset trigger action, performing switching to acquire the second video image by using the second photographing device.

7. The method according to claim 1, wherein the displaying the virtual object on the second video image comprises:

obtaining a second video sequence frame comprising the virtual object;

superimposing the second video sequence frame on the second video image; and playing the second video sequence frame for dynamically displaying the virtual object on the second video image.

8. The method according to claim 7, further comprising:

obtaining position information of the virtual object in each of video frames in the second video sequence frame; and determining a second motion track of the virtual object on the second video image based on the position information;

wherein the dynamically displaying the virtual object on the second video image comprises:

dynamically displaying the virtual object on the second video image along the second motion track.

9. The method according to claim 1, further comprising:

detecting a second target object in the second video image; and performing deformation processing on the second target object to obtain a second video image with a deformed second target object, and displaying the second video image with the deformed second target object on the screen.

10. An image processing apparatus, applied to a terminal, wherein the terminal comprises a first photographing device and a second photographing device, and the apparatus comprises:

at least one processor, and at least one memory communicatively coupled to the at least one processor and storing instructions that upon execution by the at least one processor cause the apparatus to:

acquire a first video image by using the first photographing device, and display the first video image on a screen;

display a virtual object selection page where a virtual object request display control corresponding to a virtual object is displayed;

display the virtual object on the first video image, wherein a state of the virtual object changes dynamically;

in a case that it is detected that a display object in the first video image meets a preset switching condition, perform switching to acquire a second video image by using the second photographing device, and display the second video image on the screen;

display the virtual object on the second video image;

combine the first video image and the second video image into a combined video image, and display the combined video image, wherein the in a case that it is detected that a display object in the first video image meets a preset switching condition, perform switching to acquire a second video image by using the second photographing device comprises:

in a case that the virtual object meets a preset state, perform switching to acquire the second video image by using the second photographing device.

11. The apparatus of claim 10, wherein the at least one memory further stores instructions that upon execution by the at least one processor cause the apparatus to:

detect a first target object in the first video image;

wherein the display a virtual object on the first video image comprises:

in a case that it is detected that the first target object in the first video image performs a preset trigger action, display the virtual object on the first video image.

12. The apparatus of claim 10, wherein the at least one memory further stores instructions that upon execution by the at least one processor cause the apparatus to:
obtain a first video sequence frame comprising the virtual object;
superimpose the first video sequence frame on the first video image; and
play the first video sequence frame for dynamically displaying the virtual object on the first video image.

13. The apparatus of claim 12, wherein the at least one memory further stores instructions that upon execution by the at least one processor cause the apparatus to:
obtain position information of the virtual object in each of video frames in the first video sequence frame; and
determine a first motion track of the virtual object on the first video image based on the position information;
wherein the dynamically displaying the virtual object on the first video image comprises:
dynamically displaying the virtual object on the first video image along the first motion track.

14. The apparatus of claim 10, wherein that the virtual object meets a preset state comprises:
that the virtual object is displayed at a certain position in the first video image.

15. The apparatus of claim 10, wherein the at least one memory further stores instructions that upon execution by the at least one processor cause the apparatus to:
detect a first target object in the first video image;
wherein the in a case that it is detected that a display object in the first video image meets a preset switching condition, perform switching to acquire a second video image by using the second photographing device comprises:
in a case that it is detected that the first target object performs a preset trigger action, perform switching to acquire the second video image by using the second photographing device.

16. A computer-readable non-transitory storage medium, bearing computer-readable instructions that upon execution on a computing device cause the computing device at least to:
acquire a first video image by using a first photographing device, and display the first video image on a screen;
display a virtual object selection page where a virtual object request display control corresponding to a virtual object is displayed;
display the virtual object on the first video image, wherein a state of the virtual object changes dynamically;
in a case that it is detected that a display object in the first video image meets a preset switching condition, perform switching to acquire a second video image by using a second photographing device, and display the second video image on the screen;
display the virtual object on the second video image, wherein the state of the virtual object changes dynamically;
combine the first video image and the second video image into a combined video image, and display the combined video image,
wherein the in a case that it is detected that a display object in the first video image meets a preset switching condition, perform switching to acquire a second video image by using the second photographing device comprises:
in a case that the virtual object meets a preset state, perform switching to acquire the second video image by using the second photographing device.

* * * * *